United States Patent
Reisinger et al.

(10) Patent No.: US 12,017,610 B2
(45) Date of Patent: Jun. 25, 2024

(54) METHOD AND CONTROL DEVICE FOR OPERATING A TRANSMITTER OF A RADIO KEY SYSTEM OF A MOTOR VEHICLE AND MOTOR VEHICLE WITH SUCH A TRANSMITTER

(71) Applicants: CONTINENTAL AUTOMOTIVE TECHNOLOGIES GMBH, Hannover (DE); BAYERISCHE MOTOREN WERKE AG, Munich (DE)

(72) Inventors: Thomas Reisinger, Regenstauf (DE); Alexander Krebs, Munich (DE)

(73) Assignees: CONTINENTAL AUTOMOTIVE TECHNOLOGIES GMBH, Hannover (DE); BAYERISCHE MOTOREN WERKE AG, Munich (DE)

( * ) Notice: Subject to any disclaimer, the term of this patent is extended or adjusted under 35 U.S.C. 154(b) by 759 days.

(21) Appl. No.: 16/972,323

(22) PCT Filed: May 7, 2019

(86) PCT No.: PCT/EP2019/061682
§ 371 (c)(1),
(2) Date: Dec. 4, 2020

(87) PCT Pub. No.: WO2019/233691
PCT Pub. Date: Dec. 12, 2019

(65) Prior Publication Data
US 2021/0245705 A1 Aug. 12, 2021

(30) Foreign Application Priority Data
Jun. 6, 2018 (DE) ...................... 10 2018 208 884.5

(51) Int. Cl.
*B60R 25/24* (2013.01)
*G08C 17/00* (2006.01)
(Continued)

(52) U.S. Cl.
CPC ............ *B60R 25/24* (2013.01); *H04L 9/3236* (2013.01); *B60R 2325/10* (2013.01); *G07C 9/00* (2013.01);
(Continued)

(58) Field of Classification Search
CPC ................ B60R 25/24; B60R 2325/10; B60R 2325/105; G08C 17/00; G08C 19/28;
(Continued)

(56) References Cited

U.S. PATENT DOCUMENTS 6,317,027 B1 * 11/2001 Watkins ............... G06K 7/0008
340/10.3
7,096,041 B2 8/2006 Brunner et al.
(Continued)

FOREIGN PATENT DOCUMENTS

CN 1717708 A * 1/2006 ............. B60R 25/24
CN 1717708 A 1/2006
(Continued)

OTHER PUBLICATIONS

Soleymani, Dariush Mohammad; Radio Resource Allocation for Overlay D2D-based Vehicular Communications in. Diss. TU Ilmenau, 2022. (Year: 2022).*
(Continued)

*Primary Examiner* — Cuong H Nguyen
(74) *Attorney, Agent, or Firm* — MEDLER FERRO WOODHOUSE & MILLS PLLC

(57) ABSTRACT

A method for operating a transmitter unit of a radio key system of a motor vehicle, wherein a control device of the transmitter unit provides that, for a respective closing operation in at least one measurement cycle, in each case in response to a polling message, in a plurality of successive time slots, in each case one of a plurality of anchor transmitters of the transmitter unit transmits an anchor message,
(Continued)

and the measurement cycle is ended by reception of a final message, which signals reception times of the anchor messages measured by a radio key system. A transmission sequence of the anchor transmitters may be determined by means of an assignment rule in which an assignment of the anchor transmitters to the time slots is carried out, wherein the assignment rule provides that the assignment takes place variably over time.

15 Claims, 5 Drawing Sheets

(51) Int. Cl.
  *H04L 9/32* (2006.01)
  *G07C 9/00* (2020.01)
(52) U.S. Cl.
  CPC ... *G07C 2009/00555* (2013.01); *G08C 17/00* (2013.01)
(58) Field of Classification Search
  CPC ...... G07C 2009/00555; G07C 9/00309; G07C 9/00182; G07C 9/00; H04W 12/043; H04L 2209/84
  USPC ................................................. 340/3.61, 5.64
  See application file for complete search history.

(56) References Cited

U.S. PATENT DOCUMENTS

| | | | |
|---|---|---|---|
| 10,252,699 B2 * | 4/2019 | Schoula | H04L 9/088 |
| 10,369,965 B2 | 8/2019 | Kaiki et al. | |
| 10,564,254 B2 * | 2/2020 | Benbouhout | G01S 5/26 |
| 2010/0074305 A1 | 3/2010 | Lee et al. | |
| 2018/0262336 A1 * | 9/2018 | Fujiwara | H04L 9/321 |
| 2018/0370488 A1 * | 12/2018 | Schoula | B60R 25/241 |
| 2019/0355196 A1 * | 11/2019 | Plattner | G01S 5/02 |
| 2021/0245705 A1 * | 8/2021 | Reisinger | H04L 9/3236 |

FOREIGN PATENT DOCUMENTS

| | | | | |
|---|---|---|---|---|
| CN | 107422306 A * | 12/2017 | ............. | B60R 25/24 |
| CN | 113165597 A * | 7/2021 | ............. | B60R 25/24 |
| DE | 102 02 282 B4 | 7/2003 | | |
| DE | 102 12 648 B4 | 4/2006 | | |
| DE | 10 2015 109 275 A1 | 12/2015 | | |
| DE | 10 2016 002 302 A1 | 9/2016 | | |
| DE | 102016002302 A1 * | 9/2016 | ............. | B60R 25/24 |
| EP | 3802234 B1 * | 1/2023 | ............. | B60R 25/24 |
| JP | 2017-125354 A1 | 7/2017 | | |
| WO | 2004051593 A2 | 6/2004 | | |
| WO | WO-2004051593 A2 * | 6/2004 | ............. | B60R 25/24 |
| WO | 2018/137923 A1 | 8/2018 | | |
| WO | WO-2019233691 A1 * | 12/2019 | ............. | B60R 25/24 |

OTHER PUBLICATIONS

Alam, M Fasiul. an abstract of "Wireless smart security system (SSS): an application for global vehicle monitoring" (Year: 2012).*
Krishna, V. Murali, and Y. Mallikarjuna Reddy. "A Novel Method for Identifying the Keyless Authentication Entry System using Mobile for Auto Mobiles (CAR)." International Journal of Computer Applications 51.7. (Year: 2012).*
Radio Key 600 Stand Alone Proximity Access Control System by Secura Key (printed from Internet on Sep. 10, 2023).*
Goodrum, Paul M., Matt McLaren, and Adam Durfee. "The Use of Smart Chip Technology in the Electrical Contracting Industry." (1999). (Year: 1999).*
X. Sun, F. R. Yu and P. Zhang, "A Survey on Cyber-Security of Connected and Autonomous Vehicles (CAVs)," in IEEE Trans on Intelligent Transportation Systems, vol. 23, No. 7, pp. 6240-6259, Jul. 2022, doi: 10.1109/TITS.2021.3085297 (Year: 2022).*
Aliwa, Emad, et al. "Cyberattacks and countermeasures for in-vehicle networks." ACM Computing Surveys (CSUR) 54.1 1-37 (Year: 2021).*
Artail, Hassan, and Noor Abbani. "A pseudonym management system to achieve anonymity in vehicular ad hoc networks." IEEE Transactions on Dependable and Secure Computing 13.1 (2015): 106-119 (Year: 2015).*
Mun, Hyeran, Kyusuk Han, and Dong Hoon Lee. "Ensuring safety and security in CAN-based automotive embedded systems: A combination of design optimization and secure communication." IEEE Transactions on Vehicular Technology 69.7 7078-7091 (Year : 2020).*
International Search Report dated Sep. 12, 2019 in corresponding International Application No. PCT/EP2019/061682.
Office Action dated Sep. 26, 2022 in corresponding Chinese Appl. No. 201980038838.0.

* cited by examiner

METHOD AND CONTROL DEVICE FOR OPERATING A TRANSMITTER OF A RADIO KEY SYSTEM OF A MOTOR VEHICLE AND MOTOR VEHICLE WITH SUCH A TRANSMITTER

The invention relates to a method for operating a transmitter of a radio key system of a motor vehicle. The transmitter has several transmitting units, which are here referred to as anchor transmitters and which can consecutively transmit a respective anchor message to a radio key unit, whereby a respective distance of the radio key unit to the individual anchor transmitters can be determined on the basis of a transit time measurement. This allows to check whether the radio key unit is located in a predetermined area around the motor vehicle. The invention also includes a control device for the vehicle-side transmitter of the radio key system. Finally, the invention also includes a motor vehicle with such a transmitter.

In a motor vehicle, it may be provided that its locking system for doors and/or an immobilizer can be unlocked without the use of a mechanical key for a mechanical lock but instead on the basis of a radio key unit. Such a radio key unit can exchange predetermined radio signals with a vehicle-side transmitter of the radio key system, by which the bearer or owner of the radio key unit is authenticated and thereupon a release signal for unlocking the door locks and/or the immobilizer is generated by the radio key system.

For the described radio-based locking process, one would also like to be able to verify that the radio key unit is located in a predetermined area around the vehicle. This is intended to prevent the radio key unit from triggering the locking process even if the radio key unit is located so far away from the motor vehicle that a user or owner of the radio key unit cannot recognize who is opening the motor vehicle in the meantime.

For this distance verification, it may be provided that the radio key unit triggers a distance measurement by a polling message and that individual transmitting units of the transmitter on the vehicle side then send an anchor message to the radio key unit. The anchor message is referred to as such because the individual transmitting units of a vehicle-side transmitter are referred to as anchor transmitters. The radio key unit can measure the time that elapses between sending its polling message and receiving the individual anchor messages. In a concluding final message, the radio key unit can communicate the measured time intervals to a control device of the transmitter of the motor vehicle. In the same way, also the time interval between the transmission of the individual anchor messages on the one hand and the receiving of the final message on the other hand can be measured by this control device.

Since time measurements are made both on the side of the radio unit and on the vehicle side, this method is referred to as DS-TWR (Double Sided Two Way Ranging).

Since the respective processing times in the radio key unit and in the transmitter of the motor vehicle are known, the mere transmission time or time of flight of the individual messages can be deduced. If the propagation speed of the radio messages (polling message, anchor message, final message) is known, the distance between the radio key unit on the one hand and the respective anchor transmitter on the other hand can be deduced. The radio messages can be transmitted via UWB (Ultra Wideband) at a frequency of more than 100 kilohertz. The speed of propagation here is the speed of light.

FIG. 1 again illustrates such a locking process S. Shown here are a motor vehicle 10 and a radio key unit 11. In the motor vehicle 10 a transmitter 12 may be provided, which may have several anchor transmitters 13. The anchor transmitters 13 are distinguished by their designation A1, A2, ..., An, ..., AN, wherein N is the total number of the anchor transmitters 13 of the transmitter 12. At least one ranging cycle or measurement cycle 14 can now be performed for the described distance measurement. The radio key unit 11 can trigger the distance measurement by a polling message 15 (P), which can be received in the motor vehicle 10. A receiver can be provided in the motor vehicle 10 for this purpose. By the anchor transmitters 13, a control device 16 of the transmitter 12 can now send individual anchor messages 17 to the radio key unit 11 in response. The anchor transmitters 13 are located at different positions in the motor vehicle 10. This results in different transit times for the anchor messages 17 during their transmission through the air from the respective anchor transmitter 13 to the radio key unit 11. The anchor messages 17 are differentiated in FIG. 1 by individual designations R1, R2, ..., Rn, ..., RN, wherein N is the total number of transmitted anchor messages 17. The anchor messages 17 are transmitted one after the other. A time slot 19 is available for the transmission of each anchor message 17. The radio key unit 11 can now transmit the measured time intervals between the transmission of the polling message 15 and the receiving of the respective anchor message 17 in a final message 18 (F) to the motor vehicle 10. In the motor vehicle 10 the respective time interval between the transmission of the respective anchor message 17 and the receiving of the final message 18 can be measured in the same way.

There are attempts to manipulate this sequence of the DS-TWR, as shown in FIG. 1, in order to gain unauthorized access to a motor vehicle and/or to overcome the immobilizer of the motor vehicle without authorization.

The invention is based on the task to secure the described DS-TWR against a manipulation attempt.

The invention provides a method for operating a transmitter of a radio key system of a motor vehicle. A control device of the transmitter provides in the described manner that for a respective locking process in at least one measurement cycle or ranging cycle in each case in response to a polling message one of several anchor transmitters of the transmitter each sends out an anchor message in several consecutive time slots or time windows. As anchor message one radio signal each can be transmitted, as known as such from the state of the art in connection with the DS-TWR method. Also the polling message and the final message can be designed in a way known as such from the state of the art. The measurement cycle is terminated by receiving a final message, which signals the receiving times of the anchor messages measured by a radio key unit. The receiving times can be measured absolutely or relatively, for example with respect to the time of transmission of the polling message. The locking process can concern the unlocking and/or locking of a locking system of the motor vehicle and/or an immobilizer of the motor vehicle. Each anchor transmitter can be located at a different place of the motor vehicle. N anchor transmitters can be provided, wherein the total number can be in a range of e.g. 2 to 12.

The process steps described so far correspond to the locking process described initially, as it is known per se. However, in order to protect this locking process against a manipulation attempt, according to the invention it is envisaged that the assignment of the anchor transmitters to the time slots by an assignment rule or a so-called mapping to determine the transmission sequence of the anchor transmitters is performed. In other words, the assignment rule ensures that the anchor transmitters do not transmit their respective anchor message for each measurement cycle in the same transmission sequence. Contrary to the representation in FIG. 1 it is not clear for an observer which of the anchor transmitters will transmit an anchor message in the first time slot and which further anchor transmitter will then transmit its anchor message thereafter in the second time slot and so on. The assignment rule specifies that the assignment of anchor transmitter to time slot is performed in a time-varying manner. In two consecutively performed measurement cycles consequently a different transmission sequence may be rendered so that observing one measurement cycle does not allow for any conclusions to be drawn about the transmission sequence in the next measurement cycle.

The advantage of the invention is that no attack strategy can be developed for a locking process of a radio key system of a motor vehicle on the basis of a previously known transmission sequence of the anchor transmitters. The anchor transmitters change their transmission sequence on the basis of an assignment rule, which provides that the assignment of anchor transmitters to time slots is performed in a time-variable way, i.e. varies from measurement cycle to measurement cycle. The sequence can therefore be changed from measurement cycle to measurement cycle.

In connection with the invention, the radio key unit can be designed as a separate transceiver or be provided as a component of, for example, a smartphone or a tablet PC or a Smartwatch. The design of the radio key unit is freely selectable.

The invention also includes embodiments which provide additional advantages.

The assignment rule can be implemented, for example, as a program code or as a table.

In an embodiment, the assignment rule provides that the assignment is effected according to a predetermined permutation pattern for at least some consecutive measurement cycles. In other words, the change of the transmission sequence as it is carried out for the individual measurement cycles is deterministic and determined by the permutation pattern. For example, the permutation pattern may provide that the anchor transmitters are cyclically rotated for the transmission sequence. A predetermined permutation pattern has the advantage that the transmission behavior of the radio key system remains deterministic. Nevertheless, the transmission behavior of the transmitter from outside can only be determined by an observer with great effort.

One embodiment envisages that the assignment rule stipulates that the assignment for at least several subsequent measurement cycles is performed pseudo-randomly by a cryptographic function. As cryptographic function for instance a hash function or checksum function can be used as a basis. As input parameter of the cryptographic function for example a sequence number of the current measurement cycle can be used. A cryptographic function maps an input parameter to an output parameter, the value of which is pseudo-random. "Pseudo-random" in this connection means that furthermore deterministic calculation processes are used as a basis and no statistical processes such as for example thermal noise. The use of a cryptographic function has the advantage that independent of a number of observed measurement cycles, a prediction of the assignment or transmission sequence for a future measurement cycle is invariably impossible for an outside observer, as long as they do not know the cryptographic function and the current input parameters.

One embodiment envisages that the selected assignment in each case, i.e. the transmission sequence determined for a respective measurement cycle, is kept secret from the radio key unit. The radio key unit therefore does not know the sequence of the anchor transmitters. This is also not necessary because the radio key unit only has to measure receiving times of the anchor messages without knowing from which anchor transmitter the respective anchor message was sent. The control device assigns the receiving times signaled by the final message to the corresponding anchor transmitter in each case. In other words, the control device uses the known transmission sequence to assign the receiving times to the individual anchor transmitters. Keeping the selected assignment secret has the advantage that knowledge of the used transmission sequence does not have to be signaled outside the vehicle.

One embodiment envisages the exchange of a predetermined training sequence and/or a session key for the locking process to secure radio communication with the radio key unit. The training sequence as such is known from the state of the art and is also referred to as STS (Secure Training Sequence). Session keys are also state of the art. However, the assignment of the anchor transmitters to the time slots, i.e. the transmission sequence, is determined by a predetermined function depending on the training sequence and/or the session key. In other words, the training frequency and/or the session key is used to derive the assignment or transmission sequence according to a known or predetermined function. The training sequence and/or the session key itself is a pseudo-random input parameter for the function. The use of a predetermined training sequence and/or session key simplifies the implementation of the assignment rule. The function for determining the assignment or transmission sequence can, for example, be the cryptographic function in question, i.e. for instance a hash function.

One embodiment envisages that several measurement cycles are carried out one after the other for a locking process and that the measurement cycles are distinguished from each other by a counter index. By using several measurement cycles the distance measurement can be verified and/or made plausible. Each measurement cycle can be assigned a sequence number in this connection (e.g. first measurement cycle, second measurement cycle) so that a counter index r or the sequence number results herefrom. The assignment of anchor transmitter to time slot, i.e. the resulting transmission sequence, performed for the respective measurement cycle is determined depending on the current counter index r. By changing or incrementing the counter index consequently also the assignment is changed. This has the advantage of ensuring that during a locking process with several measurement cycles a different transmission sequence is guaranteed for each measurement cycle.

One embodiment envisages that the assignment performed for at least one or several measurement cycles is determined depending on a time signal of a timer unit. In other words, an absolute time and/or a relative time signal can be used as a basis to determine or set the transmission sequence. For example, an electronic clock or an oscillating crystal or an electronic counter can be used as a timing unit. Alternatively, a counter reading that increases with each individual transit time measurement or with each measurement cycle can also be used. The advantage of determining the assignment depending on a time signal or a counter reading is that the transmission sequence can be determined depending on the time of day and/or an operating time of the vehicle.

One embodiment envisages that in at least some measurement cycles a number M of the time slots is greater than or equal to or smaller than the number N of the anchor transmitters. If therein a larger number of time slots are provided as anchor transmitters (N>M), for example, in a time slot a transmission pause can be provided or an anchor transmitter can transmit its anchor message once more in the same measurement cycle. If fewer time slots are provided than anchor transmitters (N<M), a subgroup of the anchor transmitters can be selected for each measurement cycle for the transmission of the anchor messages. This means that then not every anchor transmitter is active in every measurement cycle. If the number of time slots is equal to the number of anchor transmitters (N=M), each anchor transmitter can be used for distance measurement. However, it is also possible that even if the number of slot transmitters is the same, an anchor transmitter sends an anchor message several times while another anchor transmitter does not send an anchor message.

In one embodiment the assignment rule for at least one time slot requires that two anchor transmitters within the time slot transmit their respective anchor message. In other words, the transmission times of two anchor transmitters overlap. This has the advantage that for an unprepared observer a radio signal which is difficult to interpret is generated.

One embodiment envisages that the assignment rule for at least one measurement cycle requires that at least one anchor transmitter sends its respective anchor message in at least two different time slots of the measurement cycle. This results in an increase of the availability and/or accuracy of a measurement of the distance from this anchor transmitter.

One embodiment envisages that for at least one measurement cycle the assignment rule requires that only some of the anchor transmitters, i.e. not all anchor transmitters, transmit their respective anchor message. This has the advantage that also the number of anchor transmitters involved in the measurement cycle and/or the group of the involved anchor transmitters can be varied.

One embodiment envisages that for at least one locking process several measurement cycles are carried out and from the final message of each measurement cycle a respective distance value of a distance of the radio key unit to each of the anchor transmitters is determined and then, however, the said release signal for the locking process is only generated if the distance values of the several measurement cycles fulfill a predetermined plausibility criterion. This means that a trade-off or compromise between the duration of the locking process (the more measurement cycles, the longer) and the safety (plausibility check of a determined distance value over several measurement cycles) is made. The plausibility criterion can mean, for example, that a predetermined minimum number of determined distance values of a distance between the radio key unit on the one hand and a respective anchor transmitter on the other hand must be smaller than a predetermined maximum value in order for the release signal to be generated. The release signal indicates that the locking process is to be carried out.

In order to carry out the method according to the invention, the invention also provides a control device for a vehicle-side transmitter of a radio key system for a motor vehicle. The control device has a calculating device which is configured to realize an embodiment of the method according to the invention. The computing device can be realized on the basis of at least one microprocessor and/or at least one microcontroller. The method steps of the method can be realized on the basis of a program code which, when executed by the computing device, realizes the embodiment of the method according to the invention. The program code may be stored in a data memory of the computing device.

Finally, the invention also includes a motor vehicle with a transmitter of a radio key system, wherein anchor transmitters of the transmitter are coupled with a control device which represents an embodiment of the control device according to the invention. In each case, for instance a radio transmitter can be provided as an anchor transmitter. The anchor transmitters may be provided at different mounting locations in the motor vehicle. The anchor transmitters are especially designed to generate a UWB radio signal. A transmission frequency is preferably greater than 100 kilohertz, in particular greater than 1 megahertz. A bandwidth is preferably more than 500 MHz and/or more than 0.2 fractional bandwidth (bandwidth divided by center frequency).

The motor vehicle according to the invention can be configured to be a motor vehicle, in particular a passenger car or a truck.

The invention also comprises the combinations of the features of the described embodiments.

In the following an embodiment of the invention is described. In this connection it is shown in the following Figures.

The execution example explained in the following is a preferred embodiment of the invention. In the execution example, the described components of the embodiment of the invention each represent individual features of the invention which are to be considered independently of each other and which also further develop the invention independently of each other and are thus also to be considered individually or in a combination other than the combination shown as part of the invention. Furthermore, the described embodiment can also be supplemented by further features of the invention already described.

In the figures, functionally identical elements are each provided with the same reference signs.

Figure 1:
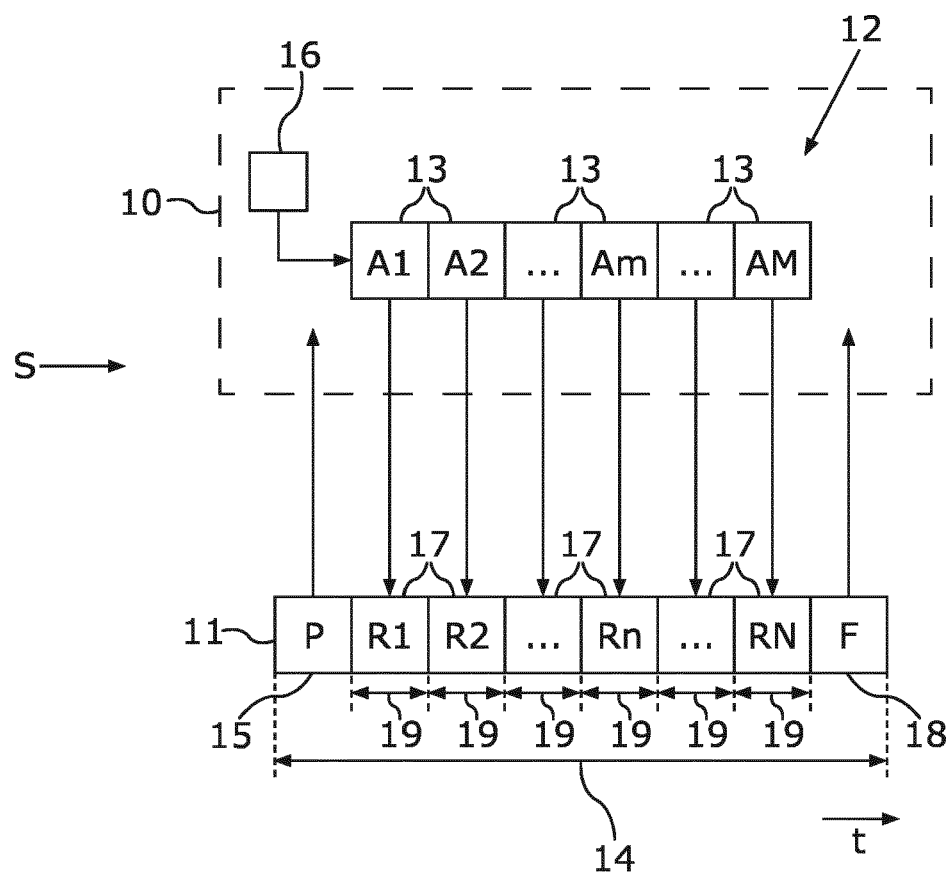
FIG. 1 is a sketch illustrating the state of the art.
Figure 2:
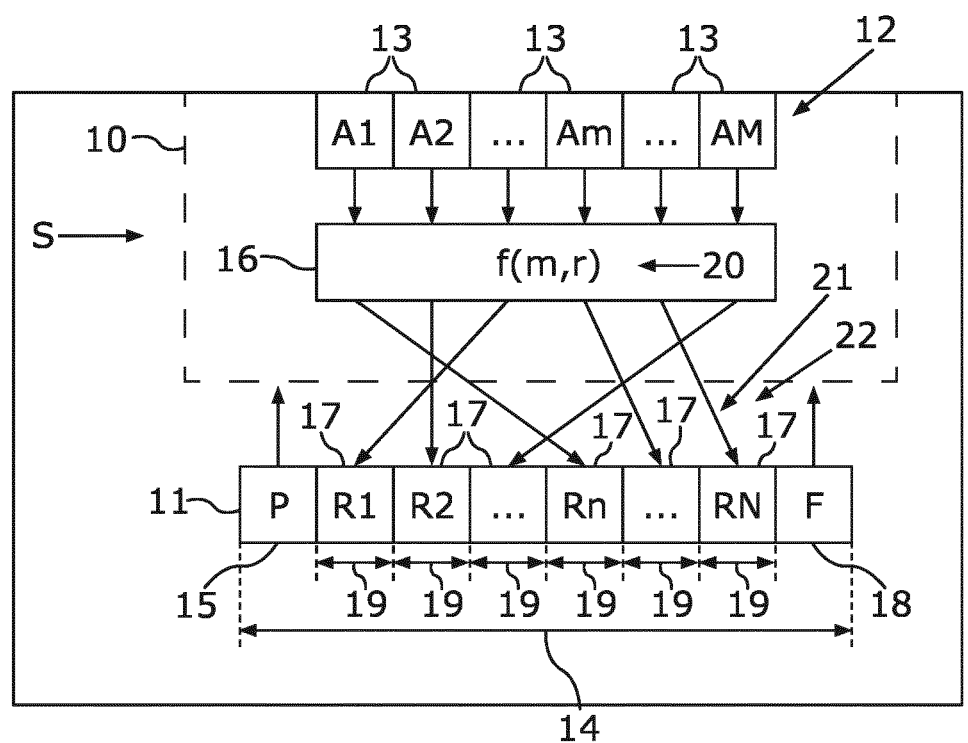
FIG. 2 is a schematic representation of an embodiment of the motor vehicle according to the invention and a representation of a radio key unit.

FIG. 2 shows a motor vehicle 10 and a radio key unit 11 in the same representation mode as FIG. 1. In the motor vehicle 10, a transmitter 12 can be provided for a radio key system, which enables a user of the radio key unit 11 to control or release a locking process S from outside the motor vehicle 10 by the radio key unit 11. For explanation of the elements with the reference signs shown reference is made to FIG. 1.

In contrast to FIG. 1, however, the control device 16 of the motor vehicle 10 according to FIG. 2 provides an assignment rule 20, which is shown here as function f (m, r), wherein the function f has an assignment 21 depending on a sequence number or an identity of the respective anchor transmitters 13 (A1, A2, ..., AN) and a current counter index r of the currently performed measurement cycle 14 as input parameters. The assignment determines a transmission sequence 22 of the anchor transmitters 13 for the current measurement cycle 14 (index r). The anchor transmitters can also be used for a distance measurement or transit time measurement inside the motor vehicle 10.

Figure 3:
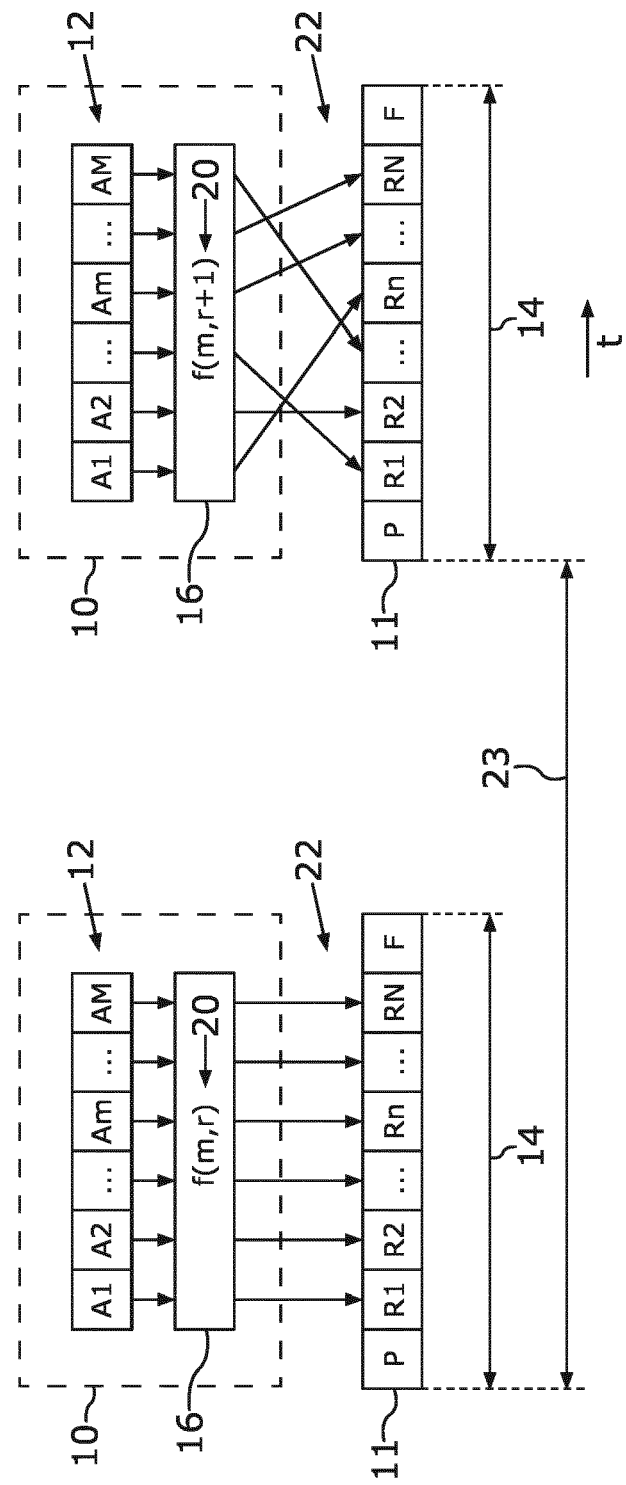
FIG. 3 is a sketch for illustrating a time-variable assignment, as it can be realized by an assignment rule of a control device in the motor vehicle.

FIG. 3 illustrates how the transmission sequence 22 is determined by the control device 16 for two consecutive measurement cycles 14 with the exemplary counter index values r and r+1 using the assignment rule 20.

The arrows shown between the control device 16 and the radio key unit 11 symbolize the transmission sequence 22 in which the anchor transmitters 13 transmit their respective anchor message 17 in the measurement cycle 14. Of course, the anchor transmitters 13 do not transmit through the control device 16, but rather the display is to be taken in a symbolic way to the effect that the assignment rule 20 of the control device 16 determines the transmission sequence 22 by controlling the anchor transmitters 13 accordingly.

Over the time t, two consecutive measurement cycles 14 with the exemplary indices r and r+1 can thus result, whereby their transmission sequence 22 may differ. A time interval between the consecutive measurement cycles is also referred to as measurement interval 23.

Figure 4:
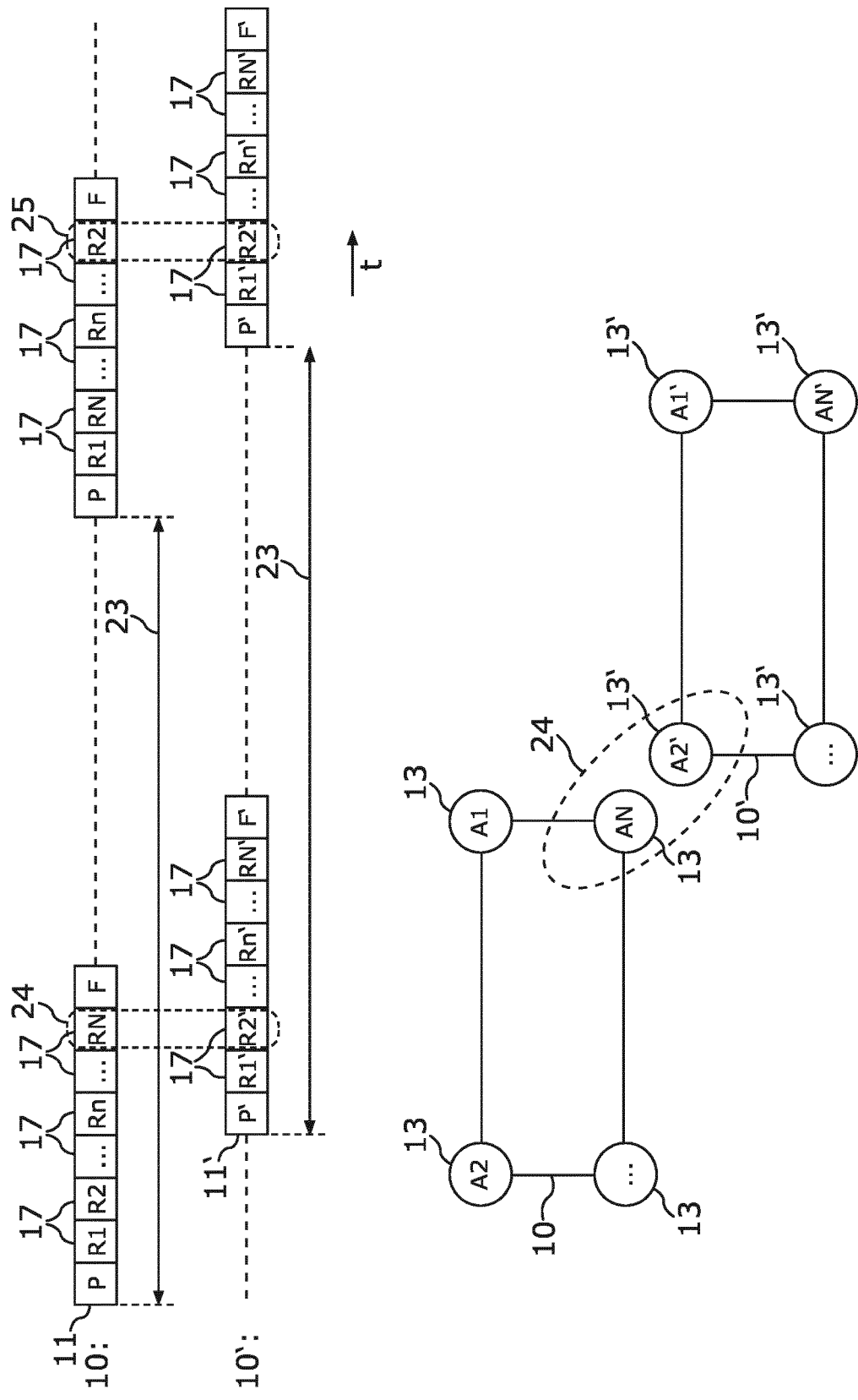
FIG. 4 is a sketch for illustrating a collision problem as to be prevented by the invention.

FIG. 4 illustrates how by the assignment rule 20 also a radio collision or interference between two motor vehicles 10, 10' can be prevented so that two colliding anchor messages can only occur for one measurement cycle.

It is shown how the anchor transmitter 13 (designated as A1, A2, . . . , An) in the motor vehicle 10 can be provided or arranged at corners of the motor vehicle 10. In the case of the motor vehicle 10' these anchor transmitters 13' can also be provided at the corners. In the parking situation shown, interference 24 may occur between the anchor transmitter An of the motor vehicle 10 and the anchor transmitter A2 ' of the motor vehicle 10' if they transmit simultaneously.

Above the parking situation is illustrated above the time t for the motor vehicle 10 and the vehicle 10' respectively, which anchor messages 17 the radio key unit 11, 11' belonging to the motor vehicle 10, 10' in each case receives. The interference 24 results during the first measurement cycle shown for the anchor messages 17 with the designations Rn for the motor vehicle 10 and R2' for the motor vehicle 10'. If one now assumes that the measurement interval 23 is equal for both motor vehicles 10, 10', the two anchor transmitters An of the motor vehicle 10 and A2' of the motor vehicle 10' would again generate the interference 24 in the next measurement cycle because they would transmit at the same time slot. This is prevented, however, in the case of the motor vehicle 10 by changing the transmission sequence and, as illustrated in FIG. 4, instead of the anchor transmitter AN for the time slot in question the anchor transmitter A2 sends its anchor message R2 so that a prevented interference 25 is rendered, since now spaced apart anchor transmitters transmit simultaneously.

Figure 5:
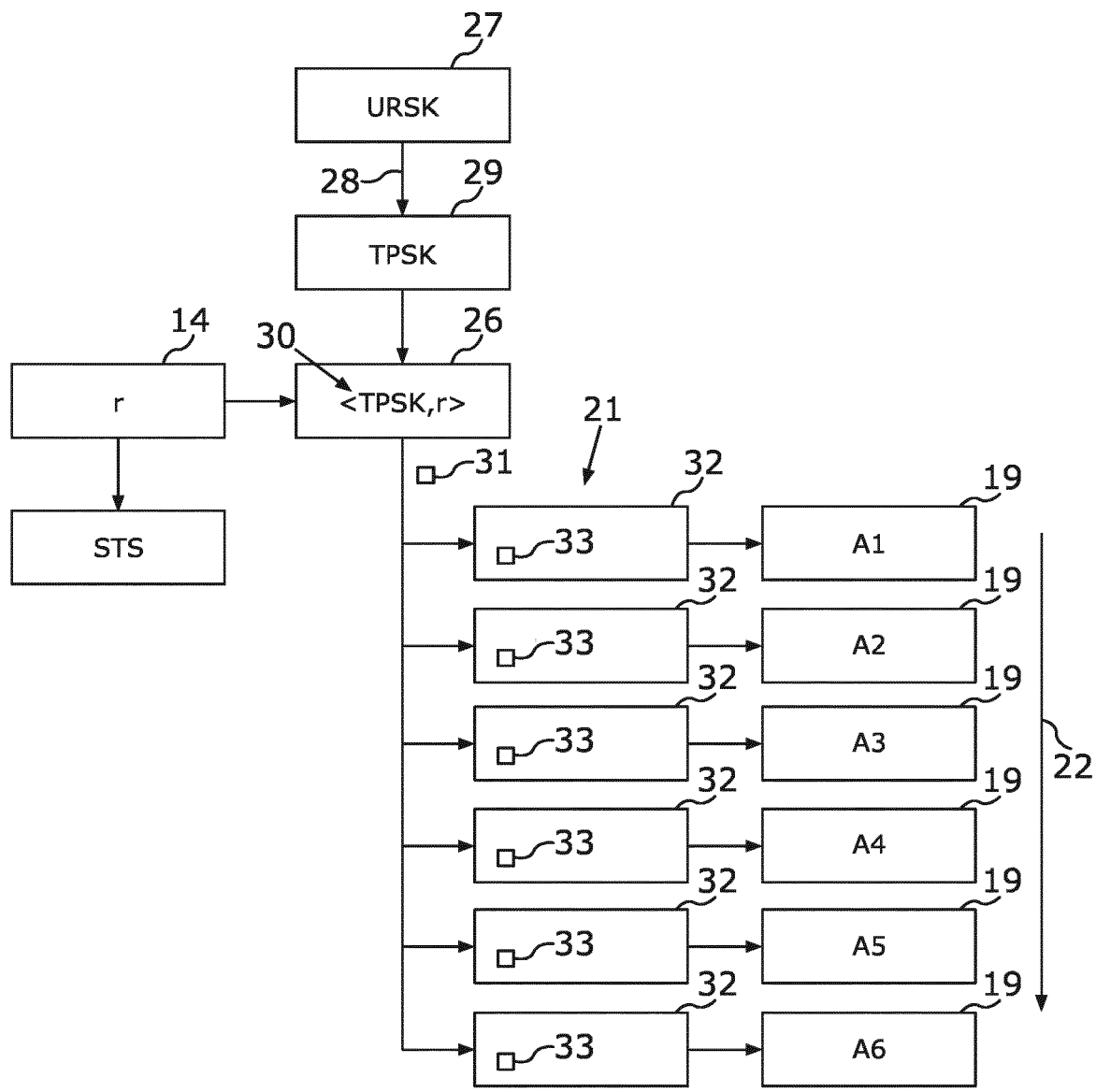
FIG. 5 is a flow diagram for illustrating the use of a session key and a cryptographic function in determining an assignment of anchor transmitters to time slots for a measurement cycle of a locking process as may be provided according to an embodiment of the method according to the invention.

FIG. 5 in a diagram illustrates how a cryptographic function 26 can be determined on the basis of a session key 27 for a radio communication the transmission sequence 22 over the time t for a given measurement cycle 14 with the counter index r. The URSK (UWB Ranging Session Key) can be used as session key 27, for example, from which a position key 29 can be determined by a predetermined function 28, which is referred to here as TPSK (Transmit Position Session Key) for example. By the cryptographic function 26, the assignment 21 can therefore be made to the first time slot 19 on the basis of the input parameters 30 consisting of the output of function 28 and the counter index r of the current measurement cycle 14. As cryptographic function 26 for example a hash value or a checksum can be calculated from the input parameters 30. The assignment 21 can then, starting for instance from the determined hash value 31, provide an offset function 32, which adds an offset value to the hash value 31, wherein each of the possible offset values 33 is assigned only once for the measurement cycle 14 so that within the measurement cycle 14 for the transmission sequence 22, one anchor transmitter A1, A2, A3, A4, A5, A6 each is assigned to exactly one still free and unused time slot 19. The example in FIG. 5 assumes that six anchor transmitters are to be assigned to six time slots 19. To determine the offset values 33 for instance a so-called shuffle function can be used as known under the name of Fisher-Yates shuffle (https://en.wikipedia.org/wiki/Fisher%E2%80%93Yates_shuffle). Such a shuffle function can receive as input value the hash value 31 and the number of time slots 19 and generates the required offset values 33.

From the current counter index r of the measurement cycle 14, a training confidence STS can also be derived.

In the case of the motor vehicle 10 shown as an example, a UWB-based time of flight measurement for determining a distance between a radio key unit 11 on the one hand and one of the anchor transmitters 13 on the other hand is thus facilitated (ToF—Time of Flight Measurement). Here the DS-TWR method with polling message P, anchor message R, and final message F can be used. The use of several anchor transmitters 13 is possible in this connection. The time of flight measurement can be periodically repeated by several measurement cycles 14 to allow a more precise localization and/or position tracking over time.

The following solutions are offered by the control device 16.

M1: The assignment (mapping) of the anchor transmitters to the time slots is effected dynamically and changes with each measurement cycle.

M2: The mapping occurs according to a predetermined pattern (for example permutation).

M3: The mapping can be cryptographically secured and known only to the participating measuring elements.

M4: The mapping is transparent for the initiator, i.e. the radio key unit, and only known to the transmitter.

M5: The mapping is derived from the cryptology for the STS (see FIG. 5).

M6: The mapping depends on the indexing r of the current measurement cycle or ranging cycle.

M7: The mapping depends on the time t (time slots).

M8: The number of time slots is equal to, less than or greater than the number of anchor transmitters (any number of anchor transmitters is mapped to any number of time slots).

M9: Time slots can be occupied multiple times (if M>N).

M10: Anchor transmitters can use several time slots within one measurement cycle (increase of the availability/accuracy).

M11: Not every anchor transmitter must be assigned one time slot per measurement cycle (if M>N).

M12: To increase safety, the control device accepts a measured value of a runtime for an anchor transmitter only after k successful plausibility checks using a plausibility criterion.

This reduces the possibility of a physical attack on the transmitter considerably, since for one measurement cycle an attacker does not know which anchor transmitter will transmit next.

An identification of the next transmitting anchor transmitter is considerably complicated by the method described here. In this connection it is to be generally stated that in a transmitter with M installed anchor transmitters the probability is 1/N that an attacker can guess the correct time slot in which a previously determined anchor transmitter will transmit if he has no special knowledge about the transmission sequence 22. In other words, this probability is equally distributed, which is why the assignment rule 20 described here can also be referred to as whitening (whitening or equal distribution). If the assignment rule 20, i.e. an appropriate mapping, is chosen for the anchor transmitters on the time slots, it can be achieved that a successful, random, K-times identification of an anchor occurs only with the probability $(1/N)^k$.

However, such an attack can be excluded by specifying a sufficiently high number of required positive validation tests, for which purpose several measurement cycles can be provided for a single locking process and the positive validation is specified by a plausibility criterion and the corresponding minimum number of positive validations is also given by the plausibility criterion. Thus the probability of success of an attack decreases exponentially with the number of positive validations defined by the plausibility criterion.

As illustrated in FIG. 4, when performing measurement cycles according to a statistical pattern with several motor vehicles, interference 24 may occur, which can be caused by simultaneous transmission of a respective anchor message of two uncoordinated anchor transmitters 13, 13' if two anchor transmitters use the same measuring interval 23 and the anchor messages partly overlap in time or there is interference between individual anchor messages.

By changing the transmission sequence 22 in consecutive measurement cycles, the assignment of time slots to anchor messages is dynamically changed, which is why no static state can be created in which two interfering anchor transmitters 13, 13' always transmit their anchor messages simultaneously for each measurement cycle. This means that for a radio key unit 11 the interference-free receiving of anchor messages can be specified or guaranteed for several measurement cycles except for one.

Since the number N of the installed anchor transmitters 13 may differ depending on the type of motor vehicle 10 and its equipment, for a coexistence of different transmitters it is required that their transmission protocol is configured to be uniform. The proposed assignment rule 20 allows a uniform length of the anchor messages to be achieved. For this purpose, a number N of time slots 9, which is prescribed by the transmission protocol, is preferably defined to be fixed. For motor vehicles with less than N anchor transmitters, an increase of the measuring accuracy can be achieved by multiple occupation of time slots with anchor transmitters. In contrast, for a motor vehicle with more than N anchor transmitters, the proposed method can achieve a temporal compression, for example by not having to transmit every anchor transmitter in every measurement cycle. It can be ensured thereby that all surplus anchor transmitters transmit their anchor message sporadically or cyclically after several measurement cycles. Furthermore, the proposed method allows the prioritization of important anchors for which the distance measurement is to be performed more frequently or with greater measuring accuracy. For this purpose, the assignment rule can be designed accordingly.

Altogether the example shows how a frame slot whitening can be achieved by the invention in measurement cycles of a transmitter of a radio key system.

LIST OF REFERENCE SIGNS 10 motor vehicle
10' motor vehicle
11 radio key unit
11' radio key unit
12 transmitter
13 anchor transmitter
13' anchor transmitter
14 measurement cycle
15 polling message
16 control device
17 anchor message
18 final message
19 time slot
20 assignment rule
21 assignment
22 transmission sequence
23 measurement interval
24 interference
25 interference-free communication
26 cryptographic function
27 session key
28 function
29 position key
30 input parameter
31 hash value
32 offset function
33 offset
r index
S locking process

What is claimed is:

1. A method for operating a transmitter of a radio key system of a motor vehicle, comprising:
   receiving, by a receiver provided in the motor vehicle, a polling message from a radio key unit;
   providing, via a control device of the transmitter of the motor vehicle, that for a respective locking process in at least one measurement cycle in each case, in response to the polling message transmitted by the radio key unit in a plurality of consecutive time slots in each case:
   sending out, via one of a plurality of anchor transmitters of the transmitter, an anchor message; and
   completing the at least one measurement cycle by receiving a final message which signals receiving times of the anchor message measured by a radio key unit;
   wherein for determining a transmission sequence of the plurality of anchor transmitters, an assignment of the plurality of anchor transmitters to the plurality of consecutive time slots is performed by an assignment rule, the assignment rule providing that the assignment is effected in a time-variable manner; and
   wherein the assignment selected is kept secret from the radio key unit and the control device assigns the receiving times signaled by the final message to an associated anchor transmitter.

2. The method according to claim 1, wherein the assignment rule provides that the assignment for at least some consecutive measurement cycles is performed according to a predetermined permutation pattern.

3. The method according to claim 1, wherein the assignment rule provides that the assignment for at least some consecutive measurement cycles is performed pseudo-randomly by a cryptographic function.

4. The method according to claim 1, wherein for the respective locking process a predetermined training sequence and/or a session key for securing a radio communication with the radio key unit is exchanged and the assignment is derived by a function depending on the training sequence and/or the session key.

5. The method according to claim 1, wherein for the respective locking process, several measurement cycles are performed one after the other and a plurality of measurement cycles are distinguished from each other by a counter index, and the assignment performed for the respective measurement cycle is determined in dependence on a respective current counter index.

6. The method according to claim 1, wherein the assignment performed for at least one measurement cycle or at least some measurement cycles is determined in dependence on a time signal of a timer unit or a counter reading.

7. The method according to claim 1, wherein in at least one or at least some measurement cycles a number of the time slots is greater than or equal to or less than a number of the anchor transmitters.

8. The method according to claim 1, wherein the assignment rule for at least one time slot provides that two anchor transmitters within the at least one time slot transmit their respective anchor message.

9. The method according to claim 1, wherein the assignment rule provides for at least one measurement cycle that at least one anchor transmitter transmits its respective anchor message in at least two different time slots of the at least one measurement cycle.

10. The method according to claim 1, wherein the assignment rule for at least one measurement cycle provides that only some of the anchor transmitters emit their respective anchor message.

11. The method according to claim 1, wherein for at least one locking process it is provided that a plurality of measurement cycles are carried out and from the final message of each measurement cycle a respective distance value of a distance of the radio key unit to each of the anchor transmitters is determined and a release signal for the locking process is only generated if the distance values of the plurality of measurement cycles fulfil a predetermined plausibility criterion.

12. A control device for a vehicle-side transmitter of a radio key system for a motor vehicle, the control device comprising a computing device which is configured to perform a method according to claim 1.

13. A motor vehicle comprising a transmitter of a radio key system, the transmitter including anchor transmitters coupled to the control device according to claim 12.

14. A method for operating a transmitter of a radio key system of a motor vehicle, comprising:
receiving, by a receiver provided in the motor vehicle, a polling message from a radio key unit;
providing, via a control device of the transmitter of the motor vehicle, that for a respective locking process in at least one measurement cycle in each case, in response to the polling message transmitted by the radio key unit in a plurality of consecutive time slots in each case:
sending out, via one of a plurality of anchor transmitters of the transmitter, an anchor message; and
completing the measurement cycle by receiving a final message which signals receiving times of the anchor message measured by a radio key unit;
wherein for determining a transmission sequence of the plurality of anchor transmitters, an assignment of the plurality of anchor transmitters to the plurality of consecutive time slots is performed by an assignment rule, the assignment rule providing that the assignment is effected in a time-variable manner; and
wherein for the respective locking process a predetermined training sequence and/or a session key for securing a radio communication with the radio key unit is exchanged and the assignment is derived by a function depending on the training sequence and/or the session key.

15. A method for operating a transmitter of a radio key system of a motor vehicle, comprising:
receiving, by a receiver provided in the motor vehicle, a polling message from a radio key unit;
providing, via a control device of the transmitter of the motor vehicle, that for a respective locking process in at least one measurement cycle in each case, in response to the polling message transmitted by the radio key unit in a plurality of consecutive time slots in each case:
sending out, via one of a plurality of anchor transmitters of the transmitter, an anchor message; and
completing the measurement cycle by receiving a final message which signals receiving times of the anchor message measured by a radio key unit;
wherein for determining a transmission sequence of the plurality of anchor transmitters, an assignment of the plurality of anchor transmitters to the plurality of consecutive time slots is performed by an assignment rule, the assignment rule providing that the assignment is effected in a time-variable manner; and
wherein for the respective locking process, several measurement cycles are performed one after the other and a plurality of measurement cycles are distinguished from each other by a counter index, and the assignment performed for the respective measurement cycle is determined in dependence on a respective current counter index.

* * * * *